Jan. 11, 1927.
E. R. GURNEY
1,613,750
SPRING BRACKET
Filed Dec. 18, 1925
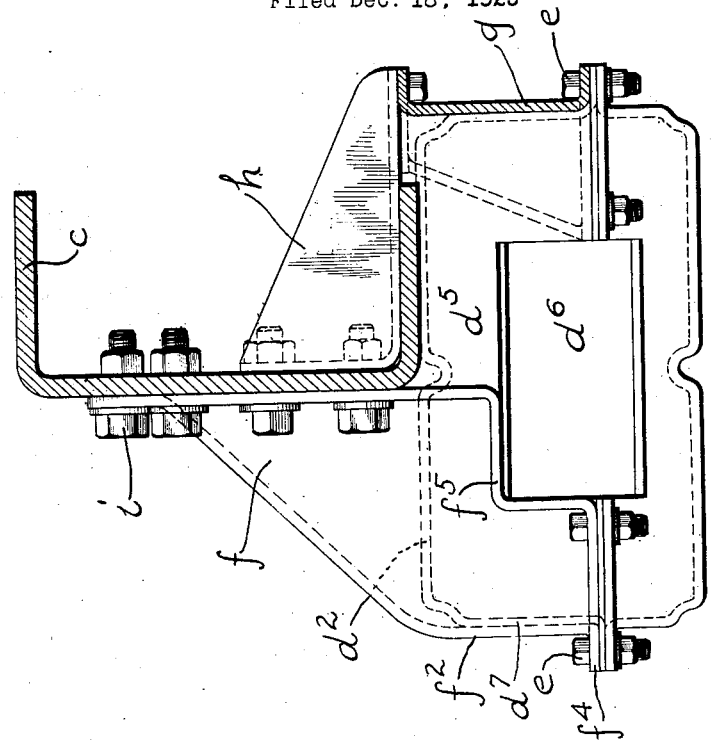
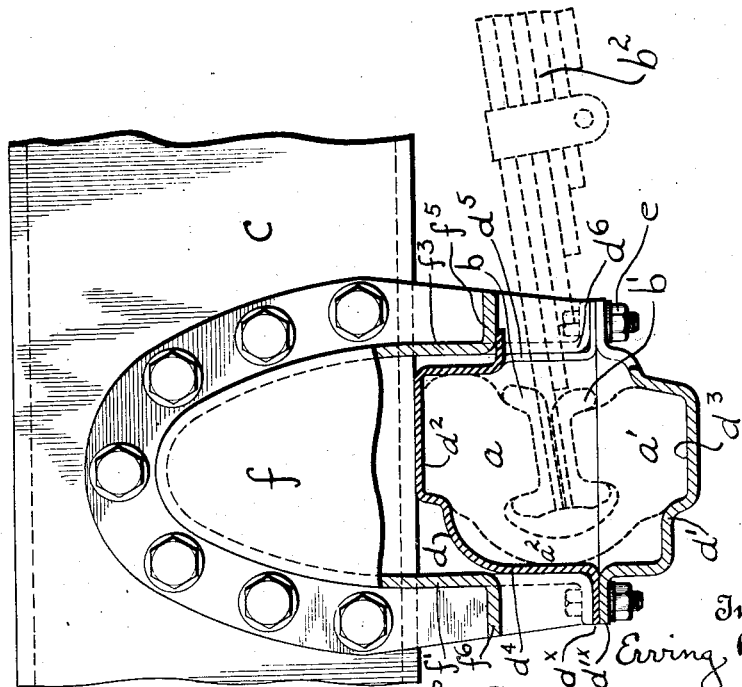
Inventor
Erving R. Gurney
By his Attorneys
Reading, Greeley, O'Shea & Campbell Patented Jan. 11, 1927.

1,613,750

UNITED STATES PATENT OFFICE.

ERVING R. GURNEY, OF BEECHHURST, NEW YORK, ASSIGNOR TO INTERNATIONAL MOTOR COMPANY, OF NEW YORK, N. Y., A CORPORATION OF DELAWARE.

SPRING BRACKET.

Application filed December 18, 1925. Serial No. 76,281.

This invention relates to housings for cushion connections in vehicle construction of the kind illustrated in Patent No. 1,404,876, dated January 31, 1922 to Alfred F. Masury and August H. Leipert. More particularly the invention relates to housings for cushion connections of the general character illustrated in the copending application by the present applicant U. S. Serial Number 33,078, filed May 27, 1925. One object of the present invention is to provide a housing for a cushion connection which may be easily and cheaply made in quantity under standard shop practice. Accordingly the housing is stamped out of sheet metal to the desired form in two complementary parts adapted to be secured together by bolts or the like whereby the cushion connection may be readily assembled under the requisite degree of compression. The invention also has for its object a re-enforcement of the housing for the cushion connection. To this end a bracket is provided securing the housing say to the vehicle frame, which bracket is so formed as to overlie the walls of the housing and is secured thereto by the same bolts securing the complementary parts of the housing together. The invention also seeks to provide a housing and bracket capable of use with the cushion connection at either end of the spring thereby reducing the manufacturing operations necessary in the production of parts for the connections. The metal stampings are therefore so formed as to be interchangeable or capable of reversal, one with another, so that identical housings and brackets will serve for both ends of the spring. These and other objects of the invention and the means for their attainment will be more apparent from the following detailed description of a preferred embodiment thereof, which is illustrated in the accompanying drawings and in which:

Figure 1 is a view in side elevation and partly in section showing the housing and re-enforcing bracket therefor secured to the side frame member of a vehicle chassis and adapted to receive a cushion connection for the vehicle spring.

Figure 2 is a view in front elevation showing the housing and re-enforcing bracket and the chassis frame member in section.

The cushion connection for which the housing according to the present invention is designed comprises generally vertical columns $a$, $a'$, of yielding non-metallic material connected by a thrust section $a^2$ of the same material. The columns engage seats $b$, $b'$ on the end of the vehicle leaf spring $b^2$ and serve as the connection and support between the spring and the side member $c$ of the chassis frame. The housing is formed generally of a main member $d$ and a cap member $d'$ stamped out of sheet metal, such as steel, and secured together as by the bolts $e$ which pass through apertures in the cooperative flanges $d^x$, $d'^x$. It is so formed as to provide seats $d^2$, $d^3$ for the respective columns $a$, $a'$ and has a vertical rear wall $d^4$ against which the thrust section abuts. The vertical front wall $d^5$ is formed with a rectangular opening $d^6$ through which the spring enters for engagement by the cushion connection. To strengthen the walls of the housing it is proposed to form a bracket $f$, by which the housing may be secured to the frame member $c$ with a downwardly facing three sided cup portion within which the upper member of the housing is inserted and to which the housing is secured by the same bolts $e$ that secure the two parts $d$, $d'$ of the housing together, the bolts also passing through apertures in a flange $f^4$ on the bracket. Thus the rear wall $f'$ of the bracket cup portion overlies the rear wall $d^4$ of the housing, as viewed in the drawings. The outer wall $f^2$ overlies a side wall $d^7$ of the housing and the front wall $f^3$ overlies the front wall $d^5$ thereof. Both the front and rear walls $f'$, $f^3$ of the bracket cup are cut away as at $f^5$, $f^6$ to conform to the aperture $d^6$ in the housing thereby enabling housings formed by the same die to be used with brackets formed by the same die and to face in either direction to receive the spring end. While the feature of re-enforcing the walls of the housing is particularly applicable in situations where the parts are made of metal stampings it will be obvious that this re-enforcing feature is applicable irrespective of the manner of making the parts.

The housing may be further re-enforced and supported from the frame member by a flanged plate $g$ secured at its lower end to the flanges $d^x$, $d'^x$ by the bolts $e$ and at its upper end to a bracket $h$ carried with the frame member and, if desired, secured thereto by the same bolts $i$ that secure bracket $f$ thereto.

It will thus be seen that a housing has been provided for a cushion connection in vehicle construction which may be conveniently and cheaply made in a stamping operation from sheet metal. The walls of a housing are re-enforced by a bracket member also capable of formation by a simple stamping operation. The bracket is so formed that the housing may be reversed therein and thus bracket and housing may be used at either end of the spring, thereby reducing considerably the manufacturing operations necessary in the production of parts for the spring connections.

The invention has been illustrated as applied to a cushion connection of the kind illustrated in the copending application wherein two blocks are disposed side by side within the housing in situations of heavily loaded springs. It is not to be deemed limited to such use, however, nor in some aspects to the manufacture of the parts by stamping operations but is applicable in any situation where cushion connections embodying the broad principle of the patent are involved. Further, various modifications may be made in the form, disposition and method of making the co-operating parts and reference to the claims is to be had for a delineation of the scope of the invention.

What I claim is:

1. In a cushion connection for vehicle construction, in combination, a housing, a bracket to be carried with a chassis frame member and means carried with the bracket to re-enforce the housing.

2. In a cushion connection for vehicle construction, in combination, a multi-part housing, a bracket to be carried with a chassis frame member and means securing the housing to the bracket and also securing the parts of the housing together.

3. In a cushion connection for vehicle construction, in combination, a housing, a bracket to be carried with a chassis frame member formed with portions overlying portions of the housing, and means to secure the housing to the bracket.

4. In a cushion connection for vehicle construction, in combination, a housing, a bracket and means to secure the housing to the bracket in reversed position.

5. In a cushion connection for vehicle construction, in combination, a housing formed with an opening, a bracket having a three-sided cup-shaped portion to receive the housing, two of said sides being cut away to register with the opening in the bracket, and means to secure the bracket and housing together.

6. The combination with a vehicle frame member and vehicle spring, of a cushion connection and support therebetween comprising, in combination a pressed metal housing formed in two parts having co-operating flanges and an aperture through which the end of the spring extends, a pressed metal bracket to be carried by the frame member and formed with depending opposed walls and a side wall extending therebetween, said opposed walls being formed with cut-away portions to register with the aperture in the housing and all of said walls being formed with flanges to co-operate with the flanges of the housing, and means to secure the flanges together.

This specification signed this 8th day of December, A. D. 1925.

ERVING R. GURNEY.